UNITED STATES PATENT OFFICE 2,462,194

PROCESS FOR THE SIMULTANEOUS PRODUCTION OF CHLORINE DIOXIDE AND NITROGEN TRICHLORIDE

Willis S. Hutchinson, St. Paul, Minn., assignor to Mathieson Chemical Corporation, a corporation of Virginia No Drawing. Application October 21, 1944, Serial No. 559,845

6 Claims. (Cl. 252—187)

This invention relates to a practical and economical method for the simultaneous generation of chlorine dioxide and nitrogen trichloride.

Mixtures of chlorine dioxide and nitrogen trichloride are particularly valuable for use in bleaching products comprising water-containing substances and substances containing fat, both of which are pigmented. Such mixtures are also of great importance in the bleaching of materials such as flour, in which the pigment is present in the fat phase which constitutes but a small percentage of the flour particle.

In accordance with the present invention the simultaneous production of chlorine dioxide and nitrogen trichloride is effected by a process which comprises contacting a chlorate and an ammonium compound, or a single compound containing both a chlorate radical and an ammonium radical, with hydrogen chloride. It is believed that the reaction according to the invention proceeds as indicated by the following equations, but it is to be understood that I am not to be held for the accuracy of any theories advanced herein:

$$12HCl + 6KClO_3 = 6ClO_2 + 6H_2O + 6KCl + 3Cl_2$$

$$3Cl_2 + 3H_2O = 3HCl + 3HOCl$$

$$3HOCl + NH_4Cl = NCl_3 + 3H_2O + HCl$$

$$6NH_4ClO_3 + 12HCl = 6ClO_2 + 6NH_4Cl + 3Cl_2 + 6H_2O$$

$$3Cl_2 + 3H_2O = 3HCl + 3HOCl$$

$$3HOCl + NH_4Cl = NCl_3 + 3H_2O + HCl$$

In one mode of executing the invention, the chlorate and ammonium compound or the single compound containing both a chlorate radical and an ammonium radical, e. g., ammonium chlorate is contacted with gaseous hydrogen chloride in the presence of a carrier upon which the chlorate and ammonium compound or the single compound, as the case may be is supported. The reactant-carrier mass may be prepared either by admixing the salts and carrier in dry form or the salts may be deposited on the carrier from solution. Since both chlorine dioxide and nitrogen trichloride are explosive in sufficiently high concentrations, it is preferable that the gaseous hydrogen chloride be carried in a large excess of an inert gas such as air, nitrogen, carbon dioxide, etc.

At least a slight amount of moisture must be present for the reaction to proceed satisfactorily. This moisture may be supplied, for example, by the natural water content of the carrier, by water which has been absorbed by the reactants or the carrier, by humidifying the air or other inert gas employed for the purpose of diluting the gaseous reaction product, and/or by using hydrogen chloride which has been produced by bubbling air through aqueous hydrochloric acid.

The reaction may be effected in aqueous solution, but this requires the use of corrosion resistant equipment, the product gases being extremely corrosive when wet, and is further disadvantageous in that uniformity in the composition of the gas mixture is only slowly attained since the chlorine dioxide, being relatively more soluble in water than the nitrogen trichloride, tends to dissolve in the solution in greater proportion. It is only after the reaction has proceeded and the solution has become saturated with both gases that a mixture of uniform composition may be withdrawn. In the reaction as executed with substantially dry materials, uniformity in the composition of the evolved gas is almost immediately obtained. Also, at the conclusion of the reaction, operations can be immediately halted, whereas in the "wet" method it is necessary to treat the solution after the reaction is complete in order to achieve complete recovery of the gases produced.

Exemplary of the preferred embodiment of the invention, a mixture of potassium chlorate and ammonium chloride in the form of finely divided solid particles are admixed with an inert carrier such as vermiculite. The reactant material is then placed in a suitable container or reactor such as a tower or a horizontally disposed tube. Hydrogen chloride produced by bubbling air through aqueous hydrochloric acid is then admitted to the reactor with an amount of air sufficient to reduce the partial pressure of the chlorine dioxide and nitrogen trichloride produced by the reaction between the hydrogen chloride and the salts on the carrier below about 50 mm. Hg for each of these gases. Exhaustion of the reaction mixture is marked by the substantial absence of chlorine dioxide and nitrogen trichloride in the product gas.

As indicated by the equations in the forepart hereof, about 6 mols of potassium chlorate should be used for each mol of ammonium chloride. A higher ratio of ammonium chloride to potassium chlorate is wasteful since the ammonium chloride can only be reacted by the chlorine set free from the potassium chlorate by the gaseous hydrogen chloride. If the ratio of the potassium chlorate to the ammonium chloride is increased, the excess chlorine formed will react all of the ammonium chloride before the potassium chlorate is exhausted. In such case, the gas at the end of the run will consist essentially of chlorine dioxide and chlorine with little or no nitrogen trichloride being present.

The amount of inert carrier relative to the reactant salts varies within wide limits depending upon the particular carrier being employed. In general, the weight of the carrier is equal to from 20% to 200% of the weight of the salts, but a greater proportion of carrier may be advantageous in some cases.

Where the gaseous product withdrawn from the reactor is to be employed in a bleaching operation it is usually still further diluted with air or other inert gas before use, the extent of the further dilution depending upon the particular material with which it is to be brought into contact. In bleaching flour, for example, good results may be obtained with mixtures in which the partial pressure of each of the chlorine dioxide and nitrogen trichloride is 5 mm. Hg or less. Although mixtures containing these low partial pressures of chlorine dioxide and nitrogen trichloride may be produced by my process through the use of a large excess of inert gas, I prefer to generate the gas mixture in as high a partial pressure as is reasonably safe and to thereafter dilute it since the size of the equipment required for a given output may be thereby considerably reduced.

In general the safe limit of nitrogen trichloride and chlorine dioxide concentrations depends upon the nature of the materials with which they are in contact. For example, when these gases are in the presence of organic materials or reducing agents, the safe limit of their concentration is lower than when they are in the presence of inorganic materials. The presence of organic materials is to be avoided during the production of the gases.

The process of the invention is easy and simple to operate since it may be controlled through the medium of a single reactant, namely, the hydrogen chloride. Through the simultaneous generation of the gases, material savings are effected in operating time and equipment.

Other inert carrier materials which may be used in lieu of vermiculite in the execution of the invention include rock wool, granulated glass wool, etc. Chlorates which may be substituted for potassium chlorate include sodium chloride, calcium chlorate, and other alkali and alkaline earth metal chlorates. In place of ammonium chloride, I may use, for example, ammonium sulfate or phosphate. If desired the invention may be practiced using a plurality of chlorates and/or ammonium compounds.

The invention is not to be restricted to the use of hydrogen chloride gas which has been produced by bubbling air through aqueous hydrochloric acid as hydrogen chloride produced by other methods may be employed. For example, I may use hydrogen chloride gas which has been produced by heating sodium chloride with sulfuric acid or by reacting chlorine and hydrogen.

I claim:

1. A process for the simultaneous generation of chlorine dioxide and nitrogen trichloride which comprises bringing hydrogen chloride into contact in a reaction zone with a chlorate radical and an ammonium radical provided by a reaction mass of the group of water-soluble salts consisting of (a) ammonium chlorate and (b) a mixture of an ammonium compound and a chlorate, a sufficient amount of moisture being present to effect the reaction, and withdrawing from the reaction zone a gaseous mixture of chlorine dioxide and nitrogen trichloride.

2. A process according to claim 1 in which the reaction mass containing a chlorate radical and an ammonium radical is supported on an inert carrier.

3. A process according to claim 1 in which the reaction mass containing a chlorate radical and an ammonium radical comprises a mixture of potassium chlorate and ammonium chloride.

4. A process according to claim 1 in which the reaction mass containing a chlorate radical and an ammonium radical comprises ammonium chlorate.

5. A process according to claim 1 in which the hydrogen chloride comprises gaseous hydrogen chloride diluted with an inert gas.

6. A process according to claim 1 in which the reaction mass containing a chlorate radical and an ammonium radical comprises ammonium chlorate supported on an inert carrier and the hydrogen chloride comprises gaseous hydrogen chloride diluted with an inert gas.

WILLIS S. HUTCHINSON.

REFERENCES CITED

The following references are of record in the file of this patent:

UNITED STATES PATENTS

| Number | Name | Date |
|---|---|---|
| 1,367,530 | Baker | Feb. 8, 1921 |
| 2,280,938 | Vincent | Apr. 28, 1942 |
| 2,289,436 | Kleijn | July 14, 1942 |
| 2,324,203 | Ferrari | July 13, 1943 |
| 2,344,346 | Evans | Mar. 14, 1944 |
| 2,390,432 | Evans | Dec. 4, 1945 |